United States Patent
White

(10) Patent No.: US 10,791,710 B1
(45) Date of Patent: Oct. 6, 2020

(54) SCENT TRAINING ASSEMBLY

(71) Applicant: Nicholas White, Catlett, VA (US)

(72) Inventor: Nicholas White, Catlett, VA (US)

( * ) Notice: Subject to any disclaimer, the term of this patent is extended or adjusted under 35 U.S.C. 154(b) by 184 days.

(21) Appl. No.: 16/150,300

(22) Filed: Oct. 3, 2018

Related U.S. Application Data

(63) Continuation-in-part of application No. 29/660,133, filed on Aug. 17, 2018.

(51) Int. Cl.
    *A01K 15/02*     (2006.01)
    *A01K 5/01*     (2006.01)

(52) U.S. Cl.
    CPC .......... *A01K 15/02* (2013.01); *A01K 5/0114* (2013.01)

(58) Field of Classification Search
    CPC ...... A01K 15/02; A01K 5/0114; A01K 7/005; A01K 5/0142; A01K 5/00
    See application file for complete search history.

(56) References Cited

U.S. PATENT DOCUMENTS

| | | | |
|---|---|---|---|
| 2,561,594 A * | 7/1951 | Pokras | A47G 19/025 220/575 |
| D245,104 S | 7/1977 | Gross | |
| 4,699,089 A | 10/1987 | Teschke | |
| D296,485 S | 6/1988 | Peterson | |
| 4,949,678 A | 8/1990 | Demko | |
| 5,113,798 A | 5/1992 | Rera | |
| D352,139 S | 11/1994 | King | |
| 5,752,464 A | 5/1998 | King et al. | |
| D423,732 S | 4/2000 | McGee | |
| D446,362 S | 8/2001 | Choi et al. | |
| D448,127 S | 9/2001 | Zelinger | |
| 6,314,911 B1 * | 11/2001 | Kaytovich | A01K 5/0114 119/61.5 |
| D523,185 S | 6/2006 | Oliphant | |
| D523,996 S | 6/2006 | Fine | |
| 7,207,291 B1 | 4/2007 | Watts | |
| D554,316 S | 10/2007 | Brothers | |
| D602,653 S | 10/2009 | Mendenhall | |
| 7,856,944 B1 * | 12/2010 | Stauffer | A01K 5/0114 119/61.5 |
| 8,342,128 B2 | 1/2013 | Rocker | |

(Continued)

FOREIGN PATENT DOCUMENTS

KR      20130047141 A     5/2013

OTHER PUBLICATIONS

Machine-Generated English Translation of KR20130047141 obtained at https://translationportal.epo.org/emtp/translate/?ACTION=description-retrieval&COUNTRY=KR&ENGINE=google&FORMAT=docdb&KIND=A&LOCALE=en_EP&NUMBER=20130047141&SRCLANG=ko&TRGLANG=en>.

*Primary Examiner* — Monica L Barlow

(74) *Attorney, Agent, or Firm* — Hanrahan Law Firm P.A.; Benjamin M. Hanrahan

(57) ABSTRACT

An assembly for scent training an animal, such as a detection or sniffer dog, is presented herein. The assembly includes a scent pod defining a pocket with an at least partially open top. The assembly also includes a food bowl defining a bowl body and a raised scent distribution column surrounded by a food receiving trough region. The raised scent distribution column includes an at least partially hollow interior portion defined by at least one wall and a scent permeable top surface. The scent pod is selectively movable between an independent use with the lid, and a removable attachment with the food bowl.

19 Claims, 11 Drawing Sheets

(56) References Cited

U.S. PATENT DOCUMENTS

| | | |
|---|---|---|
| 8,381,684 B2 | 2/2013 | Crawford |
| D682,482 S | 5/2013 | Nelson |
| D694,849 S | 12/2013 | Ots |
| D718,004 S | 11/2014 | Stovall |
| D745,386 S | 12/2015 | Covey et al. |
| D762,017 S * | 7/2016 | Tsengas ............... A01K 5/0114 |
| | | D30/129 |
| 9,545,081 B2 | 1/2017 | Nolan |
| D799,756 S | 10/2017 | Fox |
| D805,700 S | 12/2017 | Owens, III |
| D874,742 S | 2/2020 | Glaros |
| 2005/0224003 A1 | 10/2005 | Yin et al. |
| 2006/0137241 A1* | 6/2006 | Yamasaki ........... A01M 1/2033 |
| | | 43/125 |
| 2007/0074667 A1* | 4/2007 | Quinn ................. A01K 5/0128 |
| | | 119/28.5 |
| 2008/0216754 A1 | 9/2008 | Lorenzana et al. |
| 2009/0044755 A1 | 2/2009 | Volotzky |
| 2012/0210942 A1* | 8/2012 | Wacker .................... A01K 7/06 |
| | | 119/72 |
| 2013/0291802 A1 | 11/2013 | Carpentieri |
| 2015/0114301 A1* | 4/2015 | Nolan .................. A01K 5/0114 |
| | | 119/61.5 |
| 2016/0174525 A1* | 6/2016 | DeGreeff ............... A01K 15/02 |
| | | 119/712 |
| 2017/0035025 A1 | 2/2017 | Oates |
| 2017/0367298 A1* | 12/2017 | Maughan ............... A01K 15/02 |
| 2020/0077621 A1* | 3/2020 | Houx ................... A01K 5/0114 |

* cited by examiner

SCENT TRAINING ASSEMBLY

CLAIM OF PRIORITY/CROSS REFERENCE TO RELATED APPLICATIONS

The present application is a continuation-in-part patent application of previously-filed, currently-pending U.S. design patent application Serial No. 29/660,133 filed on Aug. 17, 2018, the contents of which are incorporated herein in their entirety by reference.

FIELD OF THE INVENTION

The present invention is generally directed to an assembly that can be used to train animals, such as, but not limited to dogs or canines, to recognize a selected smell or odor. In particular, the assembly can be used to train detection dogs or other animals to detect or recognize substances such as drugs, explosives, etc.

BACKGROUND OF THE INVENTION

Detection dogs or sniffer dogs are widely used by law enforcement agencies and officers in the United States and worldwide to detect illicit drugs, explosive substances, and contraband. Detection dogs or other detection animals, however, are also used in a number of other industries and for a number of other purposes in addition to law enforcement. For example, detection dogs can be trained to find game animals for hunters. In addition, detection dogs, and specifically cadaver dogs, can be trained to find or seek human remains, blood, and the like. Detection dogs can also be helpful for research purposes, for example, in order to find various biological or environmental substances for scientists working in the field.

Oftentimes, scent training an animal, such as a dog, involves gradually getting the animal to associate the smell or odor with a favorite toy. For example, once the dog begins to seek out the favorite toy, the desired scent is slowly added to the toy. This will cause the animal to begin to associate the scent or odor with the toy. Thus, over time, the animal will learn to seek out the scent or odor because it associates finding the source smell with a favorite toy or play time.

Instead of using a favorite toy, however, it may be desirable to train the animal to associate a specific scent or odor with food, particularly since many dog breeds are, by their very nature, heavily driven by food. However, in many instances, it would not be desirable to place the substance directly in the animal's food or even coat the animal's food with the substance, particularly because the substance is often an illicit drug, explosive compound, or other like substance that would not be fit for consumption.

Accordingly, there is a need for a scent training assembly that includes a modified food or water bowl within which a removable scent pod can be placed or attached. A scent or odor can be placed within the scent pod, where it can naturally permeate to the environment surrounding the food. Thus, when a dog or other animal consumes the food or water within the bowl, the scent or odor is in direct contact with its nose, and the animal will begin to associate the scent or odor with food.

It would also be advantageous if, in certain circumstances, the proposed scent pod can be used independent of the bowl. This would allow the same scent pod to be removed from the bowl and placed in another location, such as a hidden location. For example, once the animal has associated the scent or odor with food, it would be desirable to hide the scent to train the animal to seek it out. In this manner, the proposed scent pod may be removed from the bowl, capped with a scent permeable lid, and hidden in a different location, independent of the bowl.

SUMMARY OF THE INVENTION

Accordingly, the present invention is generally directed to a scent training assembly that includes at least a scent pod that is structured and configured to receive, temporarily store or otherwise carry a scent or odor that can be used to train an animal. For instance, the scent pod of at least one embodiment includes a body that defines an interior portion or pocket within which one or more scented items containing a desired scent or odor can be placed. In this manner, the scent or odor will naturally permeate from the scent pod to the desired location, such as into or around a food or water bowl or into other surrounding locations or environments.

For example, at least one embodiment of the present invention includes a food or water bowl specifically constructed and configured to removably receive or retain the scent pod. Specifically, the bowl includes a raised scent distribution column extending from an interior base or bottom and which may be substantially or completely surrounded by a food receiving region or trough. The scent distribution column includes an at least partially hollow interior portion with an open bottom.

In this manner, the scent pod is inserted into the scent distribution column through the open bottom and removably secured thereto via an attachment assembly. The attachment assembly may include, but is not limited to, one or more pegs extending from a top surface of the scent pod and one or more corresponding locking holes disposed on the bowl. The top surface of the scent distribution column is scent permeable in that it includes one or more scent distribution holes communicative with the scent pod. Accordingly, any scent or odor that is contained or disposed within the scent pod will naturally permeate from within the scent pod and through the scent permeable portion of the scent distribution column.

Thus, while the dog or animal is consuming the food or water contained in the trough of the bowl, the animal's nose will be in the direct vicinity or substantially proximate to the naturally permeated scent or odor, and the animal will, over time, associate the odor or scent with food/water.

In some embodiments, the scent training assembly also includes a lid or cover that is selectively disposed in an at least partially covering relation with the scent pod. The lid may be scent permeable, and may, in some embodiments include a plurality of holes that will function as scent distribution holes.

Furthermore, in at least one embodiment, the scent pod may also include one or more magnets or magnetized structures secured to a portion thereof. This allows the scent pod to be magnetically secured to another surface, such as a ferromagnetic surface, and used separate and independent of the bowl.

For example, in some instances, the scent pod of at least one embodiment of the present invention can be selectively movable between an independent use (separate from the bowl) and a removable attachment with the food bowl. For example, in order to move the scent pod from the bowl to a different surface or location independent of the bowl, the scent pod is first removed from the raised scent distribution channel of the bowl. Then, the scent permeable lid is added to the scent pod allowing the scent pod to be used independent of the bowl. In order to re-attach the scent pod to the bowl, the lid is removed, allowing the scent pod to secure to the bowl via the attachment assembly, as described herein.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1:
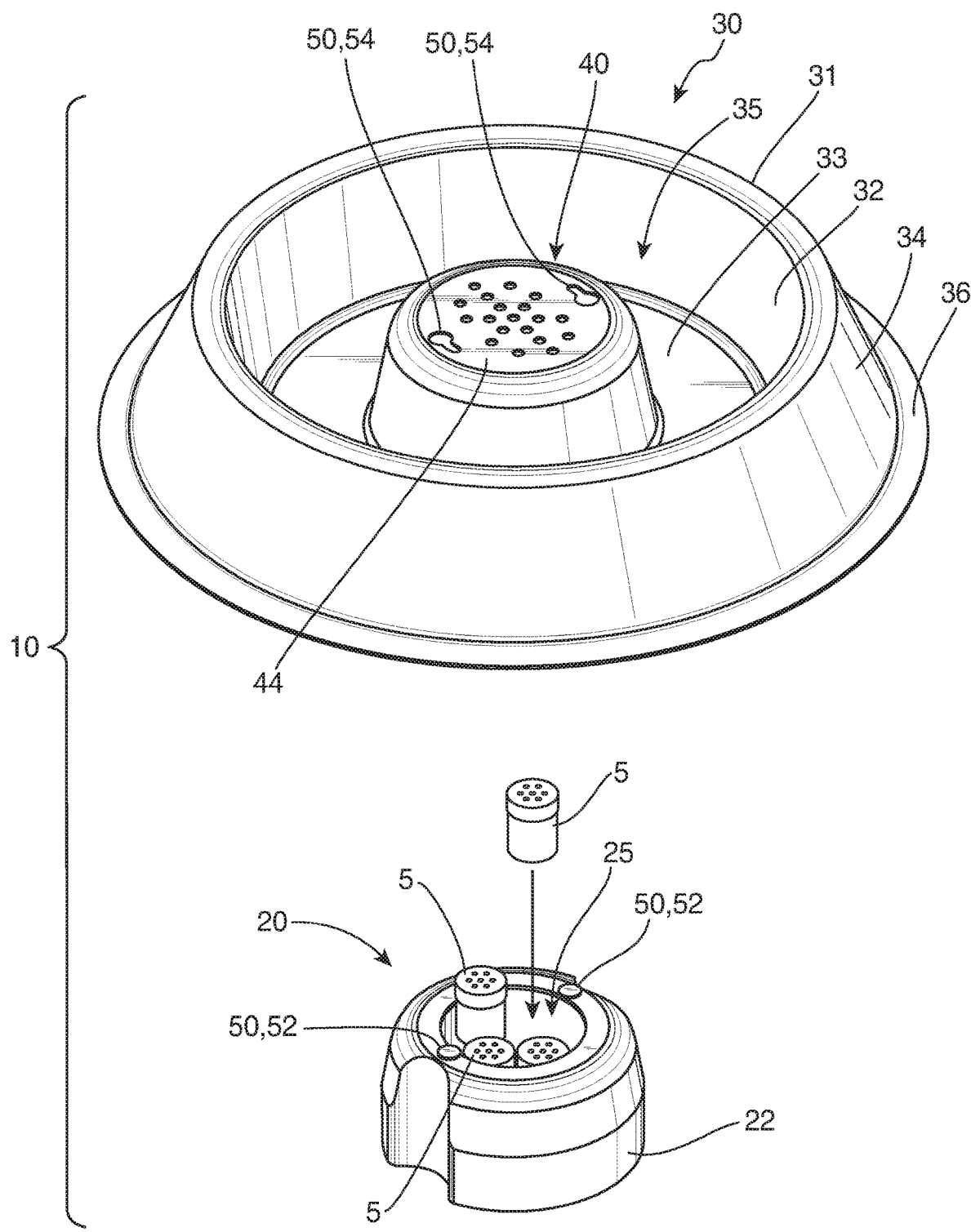
FIG. 1 is a perspective exploded view of the scent training assembly as disclosed in accordance with at least one embodiment of the present invention.
Figure 7A:
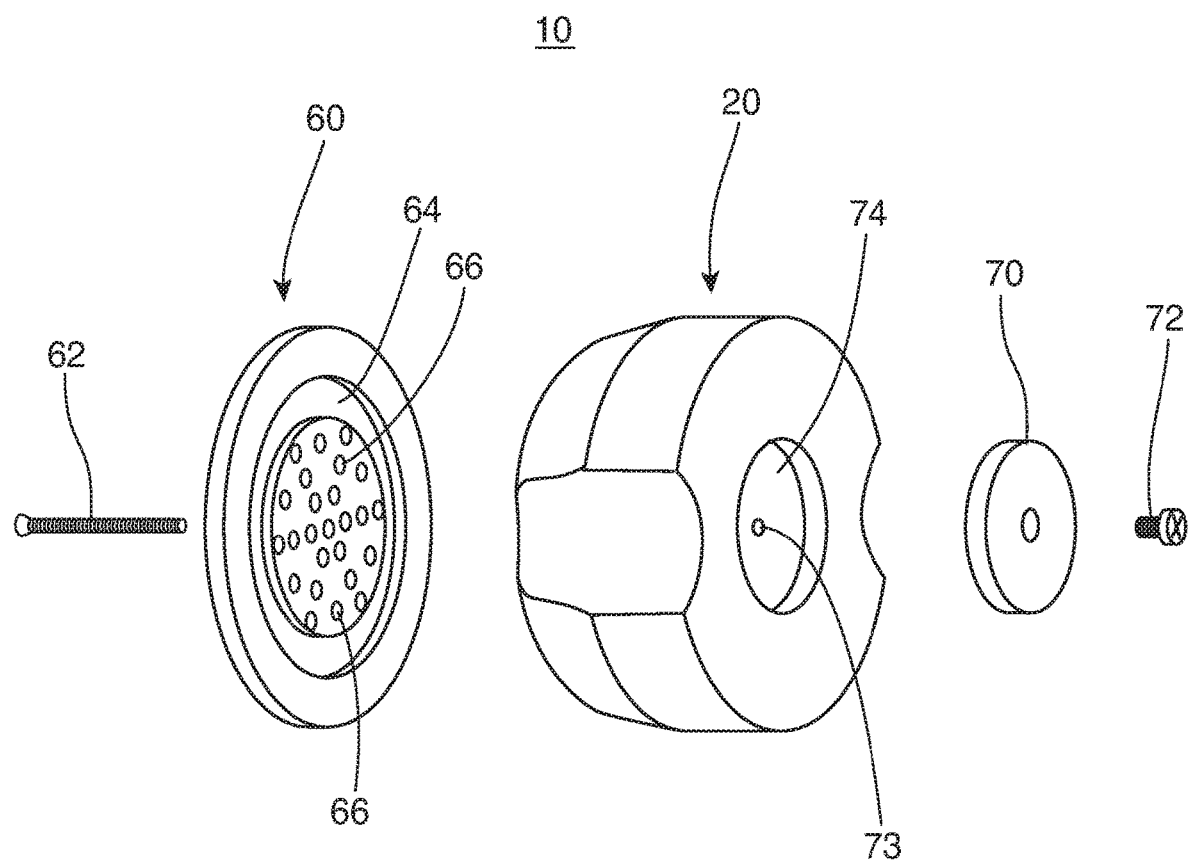
FIG. 7A is an exploded view of the scent training assembly of at least one embodiment of the present invention, including a scent pod and a lid as disclosed herein.
Figure 9:
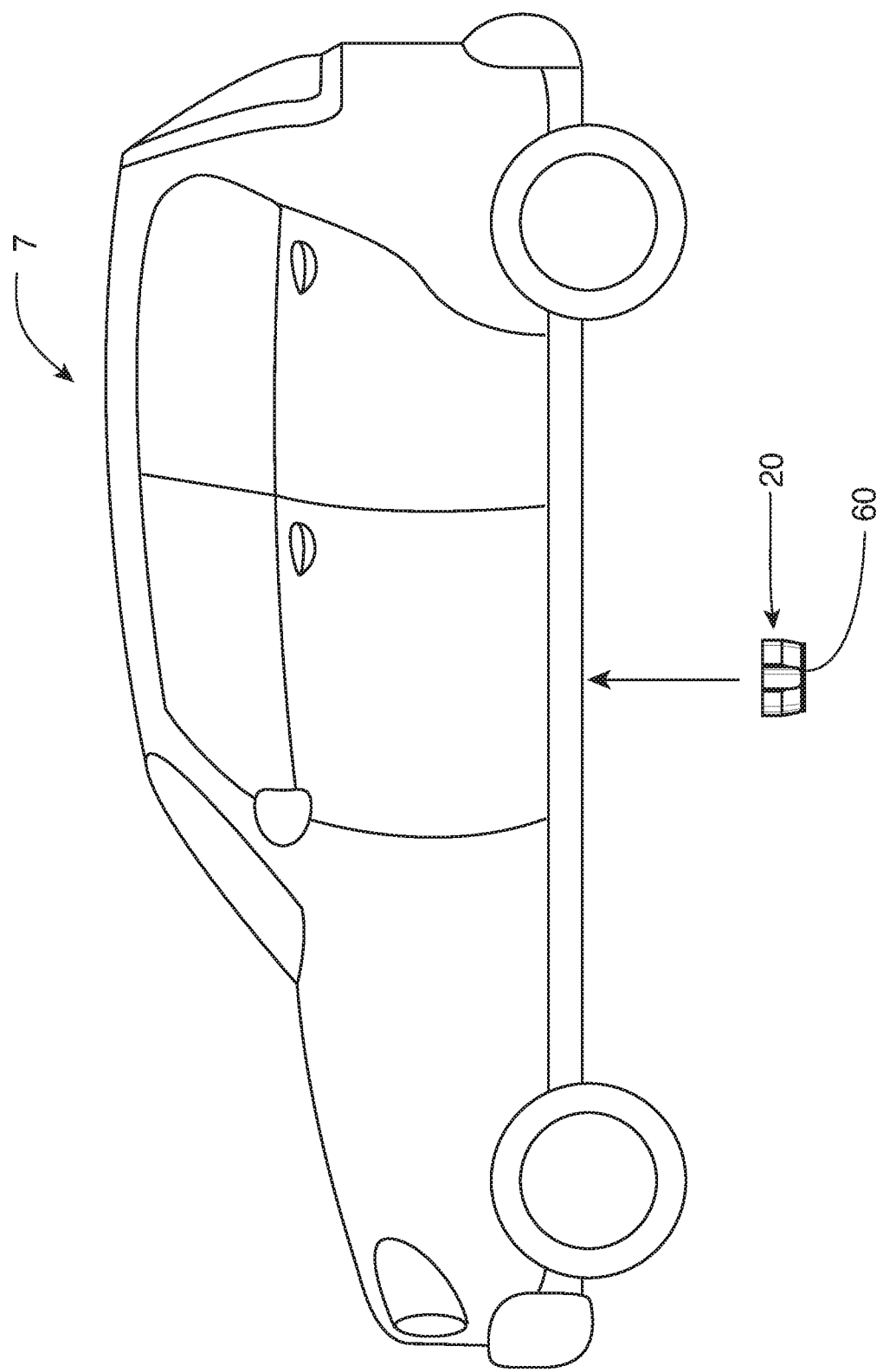
FIG. 9 is an exemplary illustration showing use of the scent pod and lid independent of the bowl as disclosed in accordance with at least one embodiment of the present invention.

As shown in the accompanying drawings, and with particular reference to FIGS. 1, 7A and 9, the present invention is directed to a scent training assembly, illustrated as 10. Specifically, the scent training assembly 10 of at least one embodiment of the present invention includes a scent pod 20 that is structured and configured to receive, temporarily store or otherwise carry a scent or odor that can be used to train an animal, including but certainly not limited to a dog or canine. It should be noted that various odors or scents can be used within the scope of the present invention depending on the particular training goals or desires. For example, many law enforcement agencies and officers in the United States and worldwide use detection dogs or sniffer dogs that are trained to recognize scents or odors associated with illicit drugs, explosive substances, blood, contraband, etc. In such a case, the scent or odor used or placed within the scent pod 20 may be representative of such scents or odors, or in some cases, may be actual samples of the illicit drugs, explosive substances, blood, contraband, etc.

As shown in FIG. 1, the scent pod 20 of at least one embodiment includes a body 22 that defines an interior portion or pocket 25 within which one or more scented items 5 containing a desired scent or odor can be placed. In the illustrated example, the scented items 5 are shown as tubes, vials, or other like containers that may contain a substance therein that emits a desired scent. The substance may be in virtually any form, including, for instance, a sample of an illicit drug, an explosive compound or substance, an oil that emits a particular scent (such as a scent similar to that of the actual drug or explosive substance, etc. It should be noted that the drug, itself, or oils, oil-soaked cotton, etc. may be placed directly into to scent pod 20 such that a separate container or vial 5 may not be necessary or used.

In any event, in at least one embodiment, the scent or odor will naturally permeate from the scent pod 20 to the desired location, such as into or around a food or water bowl (illustrated in FIG. 1 for example) or into other surrounding locations or environments (illustrated in FIG. 9, for example). In other words, the scent pod 20 of at least one embodiment of the present invention does not include additional methods for which to circulate the surrounding air or force the scent in any particular direction, such as electrical fans or the like.

In any event, as briefly mentioned above, and with reference to FIGS. 1 and 2, at least one embodiment of the present invention includes a food or water bowl, generally represented as 30 to which the scent pod 20 may be attached, as described herein. In particular, the bowl 30 includes a body 31 defined by at least one side wall or interior wall 32 and an interior base or bottom portion 33. It should be noted that the body 31 can include an outer side wall 34, a bottom lip 36, as well as other structural components to define or construct the bowl 30.

Moreover, the bowl 30 of at least one embodiment, also includes a scent distribution portion 40 such as a raised scent distribution column extending from the interior base 33, as shown in FIG. 1. In this manner, a food receiving trough or region 35 is defined by the interior base 33, side wall 32, and the raised scent distribution column or portion 40. Food or water may thus be disposed within the food receiving region 35, which in at least one embodiment, fully surrounds the scent distribution portion 40.

Figure 3:
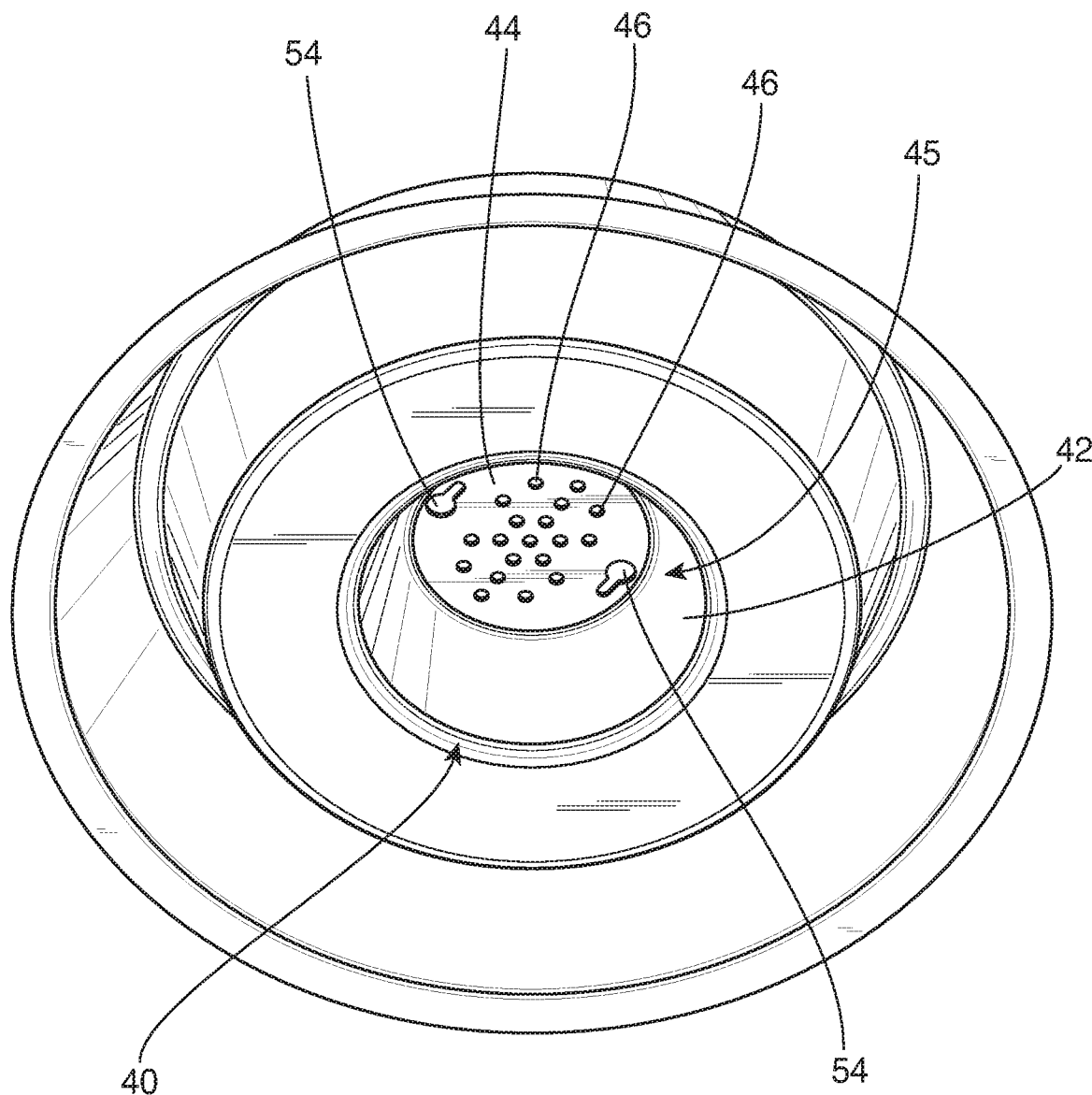
FIG. 3 is a bottom perspective view of the bowl without the scent pod as disclosed in accordance with at least one embodiment of the present invention.

Referring now to the bottom perspective view of FIG. 3, it is shown that the scent distribution portion or column 40 includes an at least partially hollow interior portion 45 defined by at least one wall 42 and a top surface 44. As illustrated, the top surface 44 is scent permeable, in that it includes a plurality of holes 46 that will function as scent distribution holes, as described herein. In addition, and still referring to FIG. 3, in at least one embodiment, the scent distribution column 40 includes an open bottom portion through which the scent pod 20 is disposed.

Figure 2:
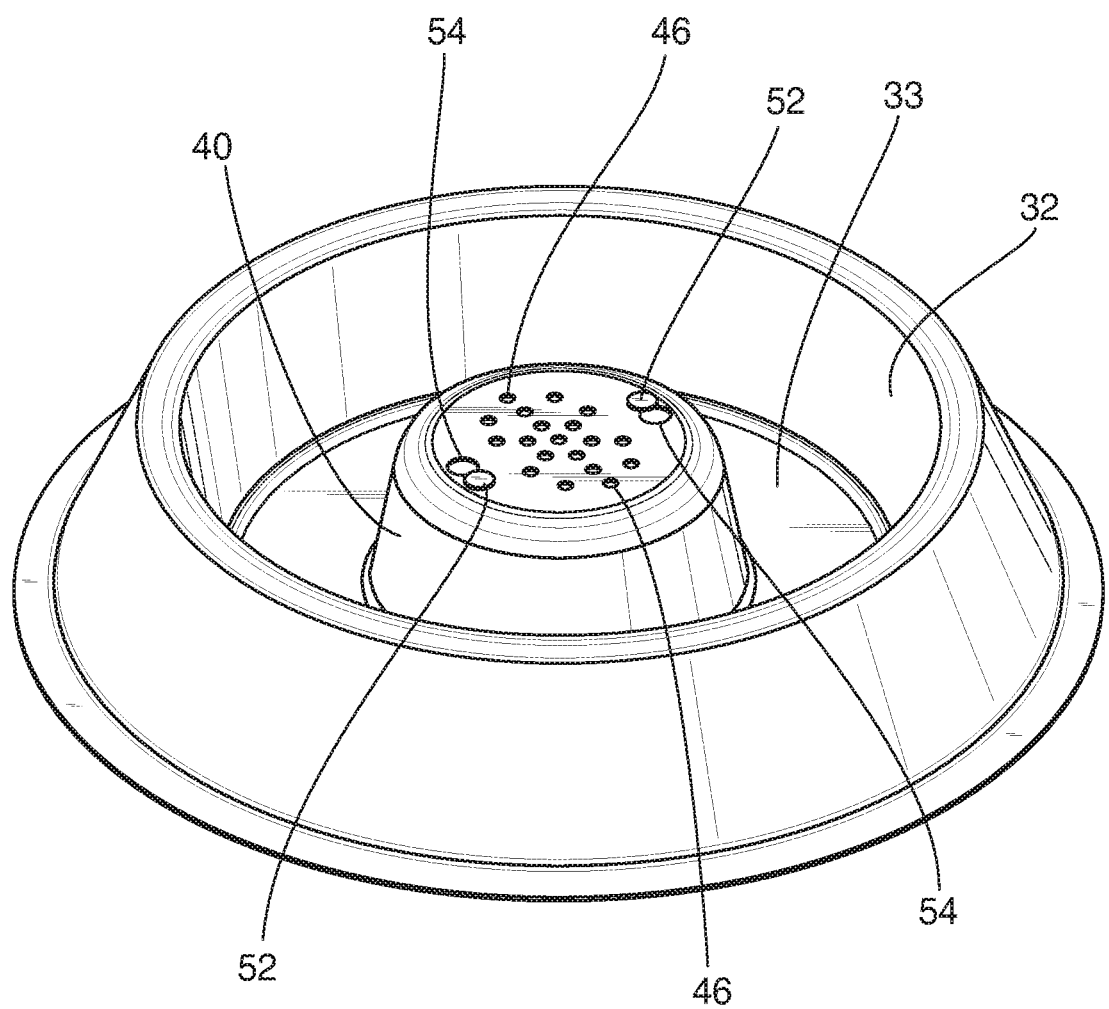
FIG. 2 is a top perspective view of the scent training assembly with the scent pod removably secured to the bowl, as disclosed herein.
Figure 4:
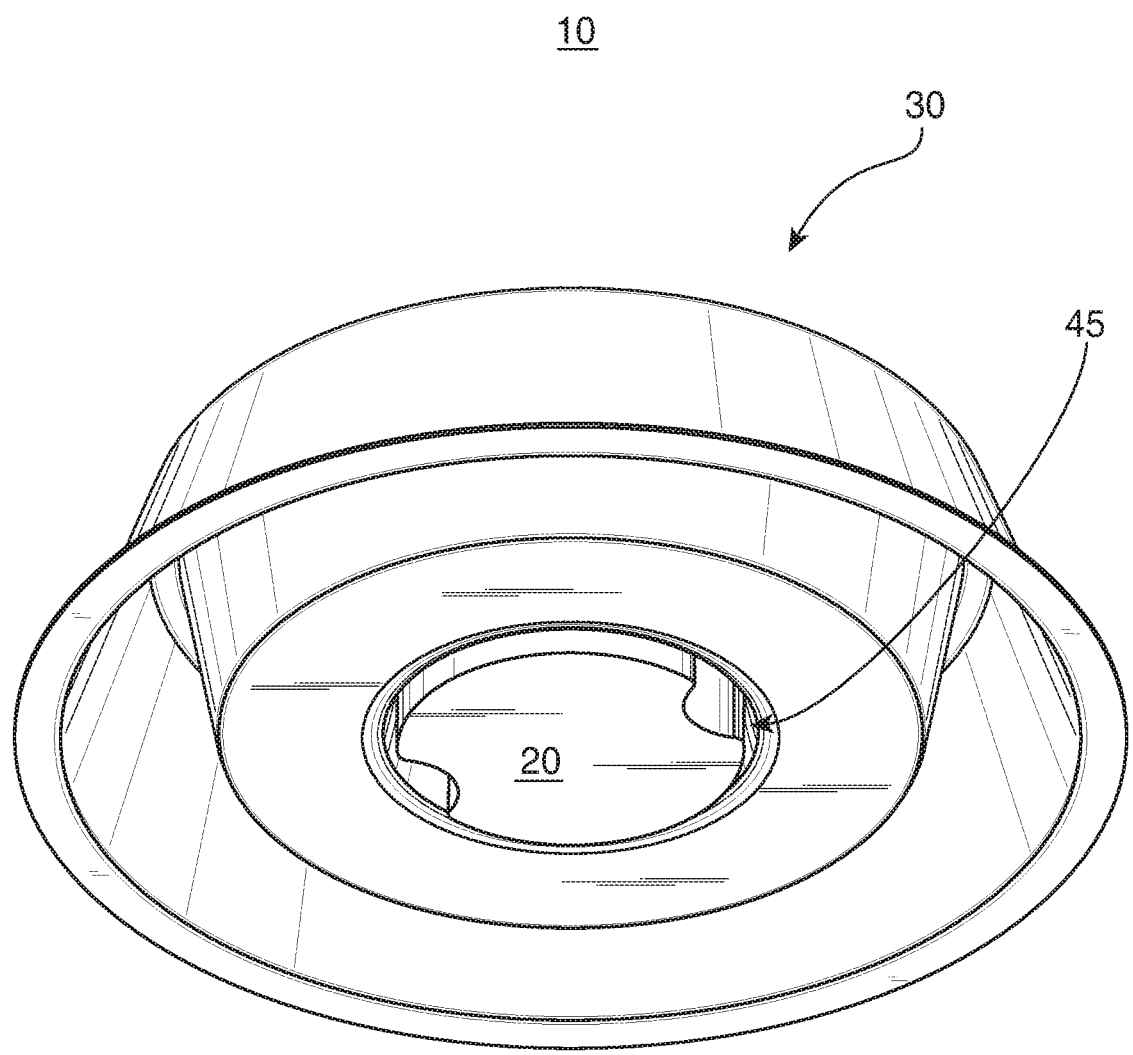
FIG. 4 is a bottom perspective view of the scent training assembly with the scent pod removably attached to the bowl as disclosed in accordance with at least one embodiment of the present invention.

Furthermore, as shown in the exploded view of FIG. 1, the top perspective view of FIG. 2 and the bottom perspective view of FIG. 4, the scent pod 20 of at least one embodiment is removably retained within the at least partially hollow interior portion 45 of the scent distribution column or portion 40 while the at least partially open top portion of the scent pod 20 is communicative with the plurality of scent distribution holes 46 of the scent distribution portion or column 40. In this manner, any scent or odor that is contained or disposed within the scent pod 20 will naturally permeate from within the pocket 25 of the scent pod 20 and through the plurality of scent distribution holes 46 of the scent distribution column 40 of the bowl 30. Thus, while the dog or animal is consuming the food or water contained in the trough 35 of the bowl 30, the animal's nose will be in the direct vicinity or substantially proximate to the naturally permeated scent or odor, and the animal will associate the odor or scent with food/water. This is a highly effective scent training method.

Figure 5:
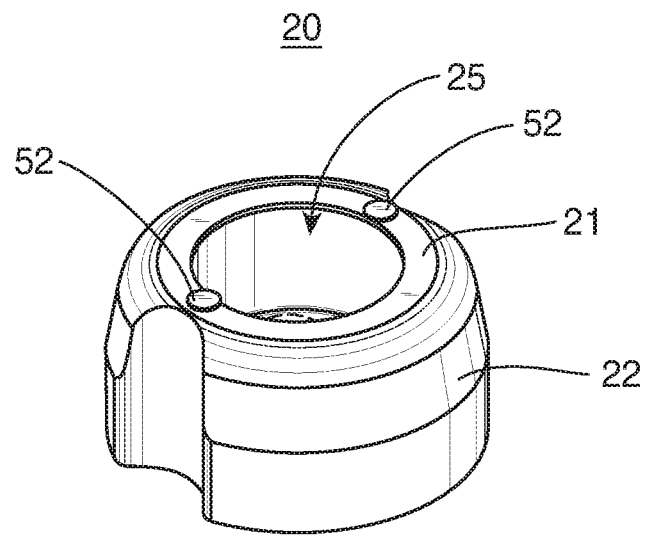
FIG. 5 is a top perspective view of the scent pod as disclosed in accordance with at least one embodiment of the present invention.
Figure 6:
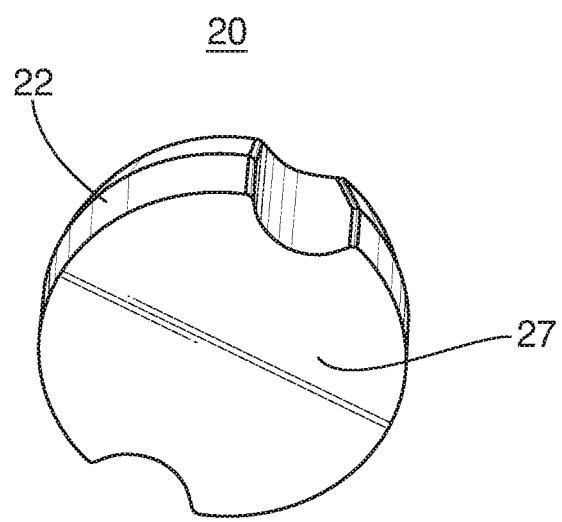
FIG. 6 is a bottom perspective view of the scent pod as disclosed in accordance with at least one embodiment of the present invention.

Still referring to FIGS. 1 through 4, as well as FIGS. 5 and 6, the scent training assembly 10 of at least one embodiment includes an attachment assembly 50 structured to facilitate the selective removable attachment of the scent pod 20 to the bowl 30. In particular, the attachment assembly 50 will allow a user to easily remove and attach the scent pod 20 to the bowl 30, and in particular, within the scent distribution column 40 thereof. Removal of the scent pod 20 will allow the user to add a scent or odor to the pocket 25 thereof, or in some embodiments, attached a lid 60 (FIGS. 7A and 7B) that will allow the scent pod 20 to be used independent of the bowl 30, described below.

In any event, the attachment assembly 50, of at least one embodiment, includes at least one peg 52 extending from the scent pod 20. In the illustrated embodiment, there are two pegs 52 extending from the top surface 21 of the scent pod 20, although other locations are contemplated. In addition, the attachment assembly 50 includes at least one cooperatively structured locking hole 54, although in the illustrated embodiment there are two locking holes 54 disposed on or through the top surface 44 of the scent distribution column 40. In this manner, the peg(s) 52 is/are selectively engaged or inserted into the locking hole(s) 54 for selective engagement or attachment between the scent pod 20 and the bowl 30.

In one exemplary embodiment, the peg(s) 52 are defined by a post extending from the surface of the scent pod with an enlarged head. Correspondingly, the locking hole(s) 54 may be defined by a keyhole-shaped opening that has a first portion that is larger than the enlarged head of the peg(s) 52 and a second slot portion that is larger than the post of the peg(s) 52 but smaller than the enlarged head of the peg(s) 52. Accordingly, the enlarged head is inserted into the first portion of the locking hole with the post extending through the locking hole 54. Twisting of either the scent pod 20, the bowl 30, or both in opposite directions, will cause the peg(s) 52 to slide to the small slot portion of the locking hole(s) 54, thereby securing the scent pod 20 in place. Removal of the scent pod 20 is achieved by twisting the scent pod 20, bowl 30 or both in a direction to align the enlarged head of the peg(s) 52 with the first portion of the locking hole(s) 54 so that the peg(s) 52 can be removed therefrom.

It should be noted that other attachment assemblies may be implemented within the full spirit and scope of the present invention to achieve a removable connection between the scent pod 20 and the bowl 30, as disclosed herein. In particular, other attachment assemblies may be in the form of or otherwise include clips, snaps, protrusions and recesses, magnetic attachment, etc.

Figure 7B:
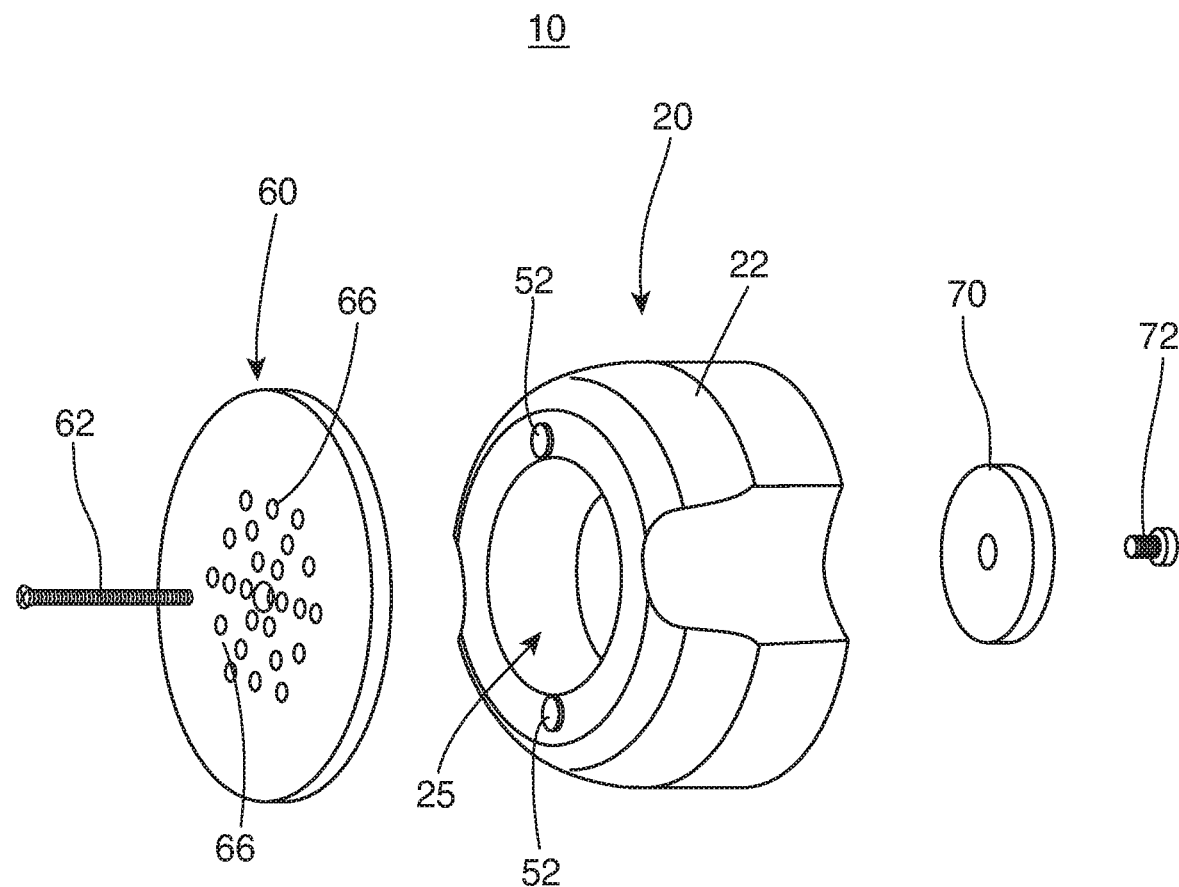
FIG. 7B is another exploded view of the scent training assembly illustrated in FIG. 7A.
Figure 8:
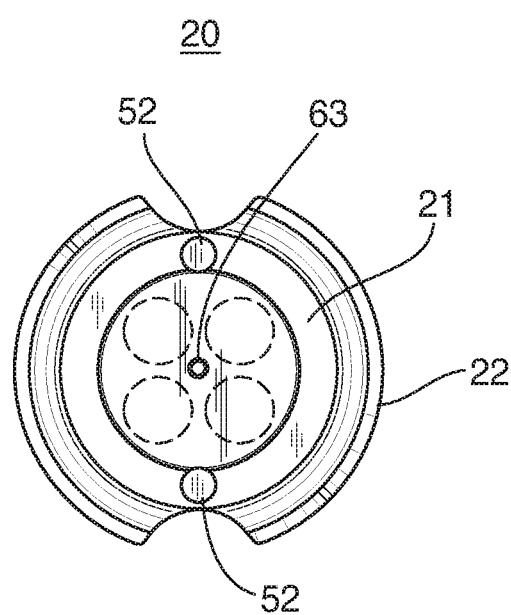
FIG. 8 is a top view of the scent pod as disclosed in accordance with at least one embodiment herein.

Referring now to FIGS. 7A and 7B, the assembly 10 of at least one embodiment further includes a lid or cover 60 that is selectively disposed in an at least partially covering relation with the scent pod 20, and in particular, in order to at least partially cover the open top end thereof. Particularly, in at least one embodiment, the lid or cover 60 may be removably secured to the scent pod 20 via a fastener 62 that engages between the lid 60 and the body of the scent pod 20. For instance, with reference to the top view of the scent pod 20 illustrated in FIG. 8, the fastener 62 may secure into a fastener hole 63 disposed on the interior of the scent pod 20. In this manner, the fastener 60 may be a screw, bolt or the like that can be selectively screwed into the hole 63 in order to removably secure the lid 60 to the scent pod 20. Of course, other attachment mechanisms are contemplated for removably attaching the lid 60, such as, but not limited to, clips, clamps, cooperative protrusions and recesses, magnetism, etc.

Referring again to FIGS. 7A and 7B, in at least one embodiment, the lid 60 includes a channel 64 disposed on the interior surface thereof. The channel 64 of at least one embodiment will align with the one or more pegs 52 extending from the top surface of the scent pod 20, allowing for the lid 60 to lay flush on the top surface of the scent pod 20. In any event, and still referring to FIGS. 7A and 7B, the lid 60 is scent permeable, and may, in some embodiments include a plurality of holes 66, as illustrated, which will function as scent distribution holes in that any scent or odor disposed within the scent pod 20 will naturally permeate through the holes 66.

Furthermore, in at least one embodiment, the scent pod 20 may include one or more magnets 70 or magnetized structures secured to a portion thereof. In the embodiment illustrated in FIGS. 7A and 7B, a magnet 70 is secured to the bottom surface 27 of the scent pod 20, and in particular, within a cooperatively structured recess 74 or indent. A fastener 72, such as, but not limited to a screw, may be used to secure the magnet 70 to the scent pod 20, for example, by penetrating or being disposed through the magnet 70 and into a corresponding screw hole 73. Other manners in which to secure the magnet(s) to the scent pod 20 are contemplated, however.

In any event, the magnet(s) 70 is used to at least partially magnetize the scent pod 20 or such that a portion of the scent pod 20 (such as the magnet 70, itself) is magnetized. This allows the scent pod 20 to be magnetically secured to another surface, such as a ferromagnetic surface. Accordingly, in at least one embodiment, the scent pod 20, along with the attached lid 60, can be secured to a ferromagnetic surface and used independent of, or otherwise without, the bowl 30. As illustrated in the example of FIG. 9, the scent pod 20 and lid 60, can be magnetically attached to the bottom (or other surface) of a vehicle, generally represented as 7. For example, the magnet 70 or bottom surface of the scent pod 20 may be magnetically secured directly to another surface, such as a ferromagnetic surface.

Figure 10:
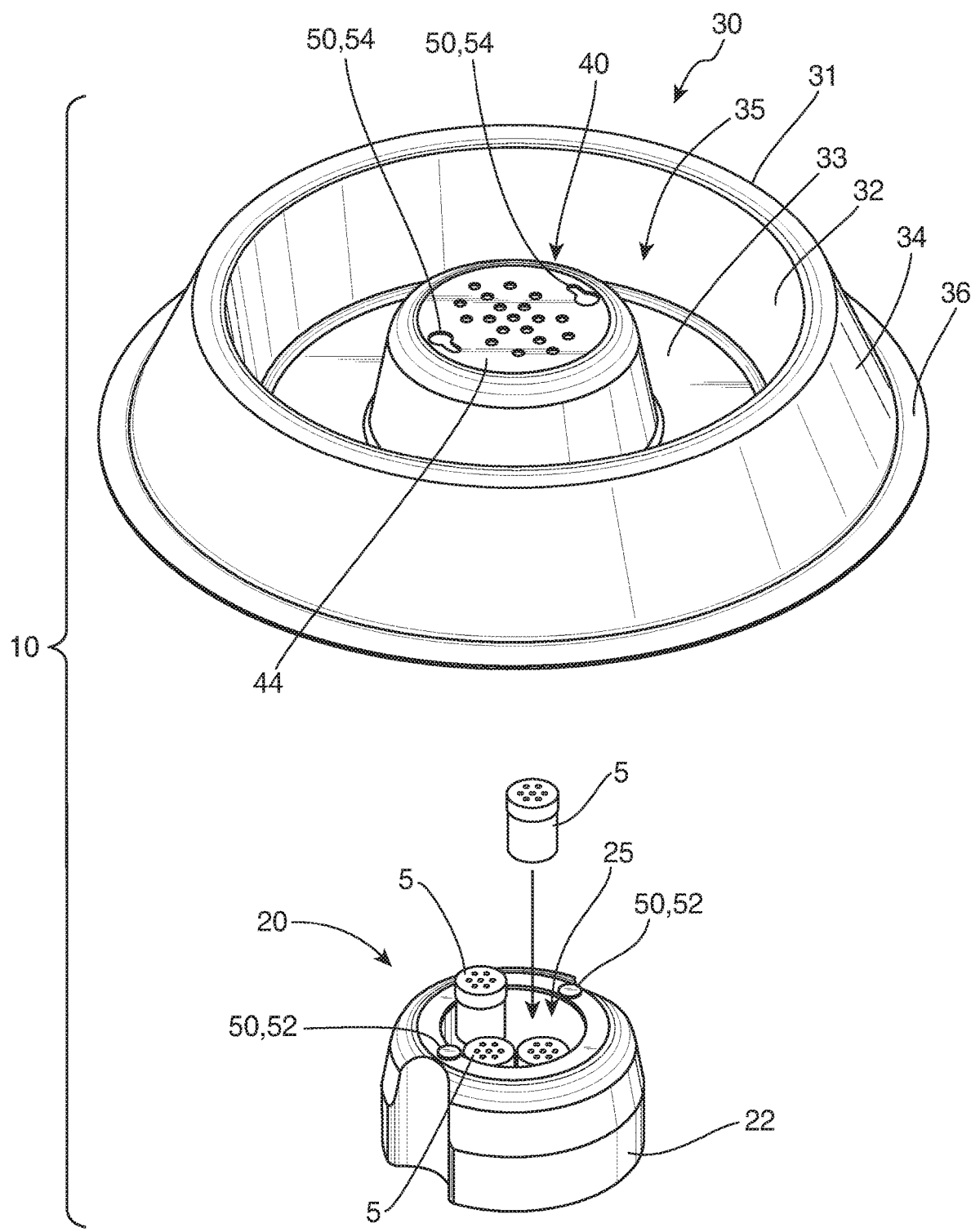
FIG. 10 is another exploded view of the scent pod illustrated in FIG. 1 being removably attached to a bowl, as disclosed in accordance with at least one embodiment herein.
Figure 11:
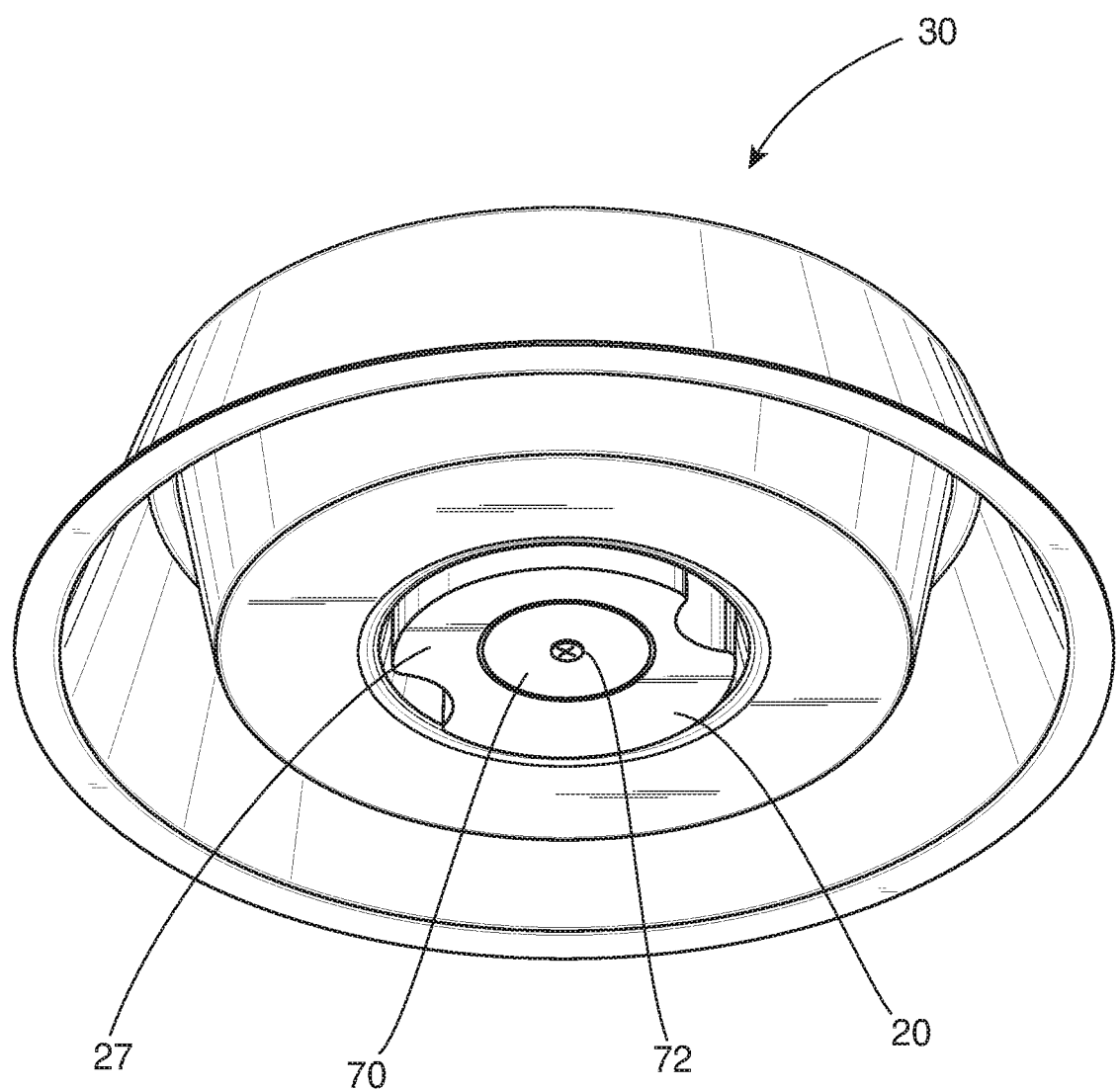
FIG. 11 is a bottom perspective view of the assembled scent pod and bowl as disclosed in accordance with at least one embodiment of the present invention.

In this manner, as shown in FIGS. 9, 10 and 11, the scent pod 20 can be selectively movable between a magnetic attachment with a ferromagnetic surface (FIG. 9) and a removable attachment with the food bowl 30 (FIGS. 10 and 11). For example, in order to move the scent pod 20 from the bowl 30 to a different surface or location independent of the bowl 30, the scent pod 20 is first removed from the raised scent distribution channel 40 of the bowl 30. At this point, the user can, if desired, access or change the scent- or odor-containing items within the scent pod 20. Then, the lid 60 is added to the scent pod 20. With the lid 60 attached, the scent pod 20 can be used independent of the bowl 30, and in the embodiment where the scent pod 20 includes a magnet 70, the scent pod 20 can be magnetically attached to a ferromagnetic surface. In order to re-attach the scent pod 20 to the bowl 30, the lid 60 is removed, allowing the scent pod 20 to secure to the bowl 30 via the attachment assembly 50, as described herein.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. An assembly for scent training an animal, said assembly comprising:
   a bowl body comprising at least one side wall and a base defining a food receiving trough region,
   a raised scent distribution column extending from said base, wherein said food receiving trough region surrounds said raised scent distribution column,
   said raised scent distribution column comprising an at least partially hollow interior portion defined by at least one wall and a top surface, said top surface comprising a plurality of scent distribution holes disposed there through, and
   a scent pod removably retained within said at least partially hollow interior portion of said scent distribution column, said scent pod comprising a pocket with an at least partially open top communicative with said plurality of scent distribution holes disposed on said top surface of said raised scent distribution column, wherein a scent will naturally permeate from within said pocket of said scent pod and through said plurality of holes disposed on said top surface of said raised scent distribution column.

2. The assembly as recited in claim 1 further comprising an attachment assembly, wherein said scent pod is removably attached to said bowl body within said at least partially hollow interior portion of said scent distribution column via said attachment assembly.

3. The assembly as recited in claim 2 wherein said attachment assembly comprises at least one peg extending from a top surface of said scent pod, and at least one cooperatively structured locking hole disposed on said top surface of said scent distribution column.

4. The assembly as recited in claim 3 wherein said at least one peg is selectively engageable with said at least one cooperatively structured locking hole to removably attach said scent pod to said bowl body within said at least partially hollow interior portion of said scent distribution column.

5. The assembly as recited in claim 4 wherein said at least one peg comprises a post and an enlarged head, and wherein said locking hole comprises a keyhole-shaped opening with a first portion that is larger than said enlarged head and a second portion comprising a slot larger than said post and smaller than said enlarged head.

6. The assembly as recited in claim 5 further comprising at least two pegs extending from said top surface of said scent pod, and at least two locking holes disposed through said top surface of said scent distribution column.

7. The assembly as recited in claim 6 wherein said at least two pegs are positionable within said first portion of said at least two locking holes, wherein rotation of said scent pod slides said post of said at least two pegs through said slot of said locking holes in order to removably lock said scent pod to said bowl body.

8. The assembly as recited in claim 7 wherein said scent distribution column comprises an open bottom portion through which said scent pod is disposed.

9. The assembly as recited in claim 8 further comprising a lid disposed in a selectively removably relation with said scent pod, said lid comprising a plurality of scent distribution holes disposed there through.

10. The assembly as recited in claim 9 further comprising a magnetic structure secured to said scent pod to at least partially magnetize said scent pod.

11. The assembly as recited in claim 10 wherein said scent pod and said lid are selectively magnetically attachable to a ferromagnetic surface independent of said bowl body.

12. The assembly as recited in claim 11 wherein said scent pod comprises a recess disposed on a bottom surface thereof, said magnetic structure being disposed within said recess.

13. An assembly for scent training an animal, said assembly comprising:
   a scent pod comprising a pocket with an at least partially open top, wherein at least a portion of said scent pod is magnetic,
   a lid selectively disposable in a covering relation to said at least partially open top of said scent pod, said lid comprising a plurality of scent distribution holes communicative with said pocket of said scent pod, wherein said scent pod and said lid are selectively magnetically attachable to a ferromagnetic surface for distribution of a scent contained within said scent pod, and
   a food bowl, said food bowl comprising:
   a bowl body comprising at least one side wall and a base at least partially defining a food receiving trough region, and a raised scent distribution column extending from said base, wherein said food receiving trough region surrounds said raised scent distribution column, said raised scent distribution column comprising an at least partially hollow interior portion defined by at least one wall and a top surface, said top surface comprising a plurality of scent distribution holes disposed there through.

14. The assembly as recited in claim 13 wherein said scent pod comprises a magnet attached to a bottom surface thereof.

15. The assembly as recited in claim 13 further comprising an attachment assembly, wherein said scent pod is selectively and removably attached to said bowl body within said at least partially hollow interior portion of said scent distribution column via said attachment assembly.

16. The assembly as recited in claim 15 wherein said attachment assembly comprises at least one peg extending from a top surface of said scent pod, and at least one cooperatively structured locking hole disposed on said top surface of said scent distribution column.

17. An assembly for scent training an animal, said assembly comprising:
   a scent pod comprising a pocket with an at least partially open top, wherein at least a portion of said scent pod is magnetic,
   a lid selectively disposable in a covering relation to said at least partially open top of said scent pod, said lid comprising a plurality of scent distribution holes communicative with said pocket of said scent pod, and
   a food bowl, said food bowl comprising:
   a bowl body and a raised scent distribution column defining a food receiving trough region, wherein said food receiving trough region surrounds said raised scent distribution column, said raised scent distribution column comprising an at least partially hollow interior portion defined by at least one wall and a top surface, said top surface comprising a plurality of scent distribution holes disposed there through, wherein said scent pod is selectively movable between a magnetic attachment with a ferromagnetic surface while said lid is attached to said scent pod, and a removable attachment with said food bowl within said raised scent distribution column while said lid is unattached to said scent pod.

18. The assembly as recited in claim 17 further comprising an attachment assembly, wherein said scent pod is selectively and removably attached to said bowl body within said at least partially hollow interior portion of said scent distribution column via said attachment assembly, wherein said attachment assembly comprises at least one peg extending from a top surface of said scent pod, and at least one cooperatively structured locking hole disposed on said top surface of said scent distribution column.

19. The assembly as recited in claim 18 wherein said scent pod comprises a magnet attached to a bottom surface thereof.

\* \* \* \* \*